United States Patent
Varma et al.

(10) Patent No.: US 6,650,623 B1
(45) Date of Patent: Nov. 18, 2003

(54) ADAPTIVE LINK LAYER FOR POINT TO MULTIPOINT COMMUNICATION SYSTEM

(75) Inventors: Subir Varma, San Jose, CA (US); Khuong Ngo, San Jose, CA (US); Jean Fuentes, Santa Clara, CA (US); Paul Truong, San Jose, CA (US); Majidi-Ahy Reza, Los Altos, CA (US)

(73) Assignee: Aperto Networks, Inc., Milpitas, CA (US)

( * ) Notice: Subject to any disclaimer, the term of this patent is extended or adjusted under 35 U.S.C. 154(b) by 0 days.

(21) Appl. No.: 09/475,642

(22) Filed: Dec. 30, 1999

(51) Int. Cl.⁷ .............................. H04L 12/28
(52) U.S. Cl. ............... 370/252; 370/469; 370/478
(58) Field of Search ................. 370/318, 328–329, 370/338, 347, 349, 445–447, 465–479, 342, 241, 230–256; 455/69, 70

(56) References Cited

U.S. PATENT DOCUMENTS

| | | |
|---|---|---|
| 5,546,411 A | 8/1996 | Leitch et al. |
| 5,553,316 A | 9/1996 | Diepstraten et al. |
| 5,598,417 A | 1/1997 | Crisler |
| 5,625,875 A | 4/1997 | Whinnett et al. |
| 5,657,325 A | 8/1997 | Lou et al. |
| 5,666,399 A | 9/1997 | Bales |
| 5,729,531 A | 3/1998 | Raith |
| 5,757,813 A | 5/1998 | Raith |
| 5,764,699 A | 6/1998 | Needham et al. |

(List continued on next page.)

FOREIGN PATENT DOCUMENTS

| | | |
|---|---|---|
| DE | 197 28 469 A1 | 7/1999 |
| EP | 1 009 182 A2 | 6/2000 |
| WO | WO 97/17768 A1 | 5/1997 |
| WO | WO 98/59523 A2 | 12/1998 |
| WO | WO 98/59523 A3 | 12/1998 |
| WO | WO 99/01959 A2 | 1/1999 |

(List continued on next page.)

OTHER PUBLICATIONS

Seyhan Civanlar and Bharat T. Doshi. "Self–Healing in Wideband Packet Networks". IEEE Network vol. 4 (1990) Jan., No. 1, New York, pp. 35–39. XP 000113853.

*Primary Examiner*—Douglas Olms
*Assistant Examiner*—Van Nguyen
(74) *Attorney, Agent, or Firm*—Swernofsky Law Group PC (57) ABSTRACT

The invention provides a method and system for a wireless transport layer, such as for use in a wireless communication system. In a preferred embodiment, the wireless transport layer includes the capability for instructing customer premises equipment to adjust the physical characteristics on its communication link with the base station controller, and for instructing customer premises equipment to conduct further communications using those new physical characteristics. The wireless transport layer includes a number of provisions for adjusting communication between the base station controller and customer premises equipment in view of the prospect of adjusting physical characteristics for communication between the two end points. The use of a point-to-multipoint wireless channel provides services over a link whose parameters are continuously adapting to current conditions on a per-user basis.

40 Claims, 4 Drawing Sheets

U.S. PATENT DOCUMENTS

| | | |
|---|---|---|
| 5,768,267 A | 6/1998 | Raith |
| 5,808,760 A | 9/1998 | Gfeller |
| 5,818,829 A | 10/1998 | Raith |
| 5,903,552 A | 5/1999 | Raith |
| 5,903,568 A * | 5/1999 | Tanaka et al. ............... 370/469 |
| 5,907,555 A | 5/1999 | Raith |
| 5,910,949 A | 6/1999 | Bilstrom |
| 5,918,176 A | 6/1999 | Arrington, Jr. et al. |
| 5,937,345 A | 8/1999 | McGowan |
| 5,995,496 A * | 11/1999 | Honkasalo et al. ......... 370/318 |
| 6,016,428 A | 1/2000 | Diachina |
| 6,018,661 A | 1/2000 | Raith |
| 6,081,514 A | 6/2000 | Raith |
| 6,091,960 A | 7/2000 | Raith |
| 6,104,932 A | 8/2000 | Havinis |
| 6,115,370 A | 9/2000 | Struhsaker |
| 6,131,012 A | 10/2000 | Struhsaker |
| 6,144,645 A | 11/2000 | Struhsaker |
| 6,144,861 A | 11/2000 | Sundelin et al. |
| 6,157,845 A | 12/2000 | Henry |
| 6,198,920 B1 | 3/2001 | Doviak |
| 6,219,557 B1 | 4/2001 | Havinis |
| 6,236,647 B1 | 5/2001 | Amalfitano |
| 6,292,471 B1 * | 9/2001 | Cao et al. .................... 370/252 |
| 6,393,008 B1 * | 5/2002 | Cheng et al. ................ 370/338 |
| 6,430,193 B1 * | 8/2002 | Raissinia et al. ........... 370/448 |
| 6,452,915 B1 * | 9/2002 | Jorgensen .................... 370/338 |

FOREIGN PATENT DOCUMENTS

| | | |
|---|---|---|
| WO | WO 99/14975 A2 | 3/1999 |
| WO | WO 99/14975 A3 | 3/1999 |
| WO | WO 99/23844 A2 | 5/1999 |
| WO | WO 99/23844 A3 | 5/1999 |
| WO | WO 99/44341 A1 | 9/1999 |
| WO | WO 00/21157 A1 | 4/2000 |
| WO | WO 01/50633 A1 | 7/2001 |
| WO | WO 01/50669 A1 | 7/2001 |
| WO | WO 02/13447 A2 | 2/2002 |
| WO | WO 02/013447 A3 | 2/2002 |
| WO | WO 02/25856 A2 | 3/2002 |

* cited by examiner

ADAPTIVE LINK LAYER FOR POINT TO MULTIPOINT COMMUNICATION SYSTEM

BACKGROUND OF THE INVENTION

1. Field of the Invention

This invention relates to a link layer, such as for use in a wireless communication system.

2. Related Art

Wireless communication between a sender and a receiver includes sending information using a wireless communication link, in which the sender modulates information onto a wireless communication channel (such as a frequency band reserved for wireless communication between the sender and the receiver). The receiver demodulates that information from the wireless communication channel, so as to recover the original information.

One problem with known systems is that physical characteristics of the communication link between the sender and receiver can change substantially over relatively short periods of time. For example, the distance between the sender and receiver can change. In a second example, the equipment used by the sender or receiver (that is the consumer premises equipment) can change. Moreover, these physical characteristics can change independently of each other. As a result, selection of a single set of such physical characteristics can result in relatively ineffective or inefficient communication between the sender and the receiver.

Accordingly, it would be advantageous to provide a technique for wireless communication, in which physical characteristics of the communication link between sender and receiver can be changed substantially during a single session of communication, that is not subject to the drawbacks of the known art.

SUMMARY OF THE INVENTION

The invention provides a method and system for a wireless transport layer, such as for use in a wireless communication system. In a preferred embodiment, the wireless transport layer includes the capability for instructing customer premises equipment to adjust the physical characteristics on its communication link with the base station controller, and for instructing customer premises equipment to conduct further communications using those new physical characteristics. In several aspects of the invention, as described herein, the wireless transport layer includes a number of provisions, such as adaptive link layer transport services and an advanced TDMA (time division multiple access) protocol. These work together to adjust communication between the base station controller and customer premises equipment in view of the prospect of adjusting physical characteristics for communication between the two end points. The use of a point-to-multipoint wireless channel provides services over a link whose parameters are continuously adapting to current conditions, on a per-user basis.

The invention provides an enabling technology for a wide variety of applications for communication, so as to obtain substantial advantages and capabilities that are novel and non-obvious in view of the known art. Examples described below primarily relate to a wireless communication system, but the invention is broadly applicable to many different types of communication in which characteristics of the communication link are subject to change.

DETAILED DESCRIPTION OF THE PREFERRED EMBODIMENT

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

Related Application

Inventions described herein can be used in conjunction with inventions described in the following documents.

U.S. Patent Application Serial No. 09/475,716, Express Mail Mailing No. EL 524 780 021 US, filed Dec. 30, 1999 in the name of Reza Majidi-Ahy, Joseph Hakim, and Subir Varma, titled "Integrated Self-Optimizing Multi-Parameter and Multi-Variable Point to Multipoint Communication System."

Each of these documents is hereby incorporated by reference as if fully set forth herein.

Lexicography

The following terms refer or relate to aspects of the invention as described below. The descriptions of general meanings of these terms are not intended to be limiting, only illustrative.

base station controller—in general, a device for performing coordination and control for a wireless communication cell. There is no particular requirement that the base station controller must be a single device; in alternative embodiments, the base station controller can include a portion of a single device, a combination of multiple devices, or some hybrid thereof.

communication link—in general, an element for sending information from a sender to a recipient. Although in a preferred embodiment the communication links referred to are generally wireless line of sight point-to-point communication links, there is no particular requirement that they are so restricted.

customer premises equipment—in general, a device for performing communication processes and tasks at a customer location, and operating in conjunction with the base station controller within a wireless communication cell. There is no particular requirement that the customer premises equipment must be a single device; in alternative embodiments, the customer premises equipment can include a portion of a single device, a combination of multiple devices, or some hybrid thereof.

physical parameters—in general, with reference to a wireless communication link, a set of characteristics or parameters relating to physical transmission of information on a communication link. For example, physical characteristics can include (a) a symbol transmission rate, (b) a number of payload data bits assigned per symbol, (c) a number of error detection or correction bits assigned per symbol, and the like.

wireless communication system—in general, a communication system including at least one communication link that uses wireless communication techniques.

wireless transport layer—in general, a set of protocols and protocol parameters for sending and receiving information using wireless transport. In a preferred embodiment, the wireless transport layer is part of a multilayer systems architecture, in which the wireless transport layer is built using a physical transport layer, and the wireless transport layer is used by a logical transport layer such as IP.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Context

A system using a wireless transport layer in a wireless communication system operates as part of a system in which devices coupled to a network (such as a computer network) send messages, route and switch messages, and receive messages. Most current link layer protocols use a simple "first come, first served" policy for serving these messages. Other systems allow the physical link to be divided into a number of virtual links, each with its own set of bandwidth and QoS parameters. Unlike the existing technology, the. device described herein also includes a virtual link that describes a set of physical layer parameters. Thus, in a preferred embodiment, devices coupled to (and integrated with) the network send, route, and receive these messages as sequences of packets, each of which has a header including delivery information and a payload including data. The packet format conforms to the OSI model, in which an application protocol (layer 4, such as TCP) uses a logical transport protocol (layer 3, such as IP), which uses a physical transport protocol (layer 2), which uses a physical transport technique (layer 1).

The system using a wireless transport layer is described herein with regard to layer 2, particularly as it applies to interactions with layer 1 and layer 3. However, concepts and techniques of the invention are also applicable to other layers of the OSI model. Adapting those concepts and techniques to such other layers would not require undue experimentation or further invention, and is within the scope and spirit of the invention.

System Elements

Figure 1:
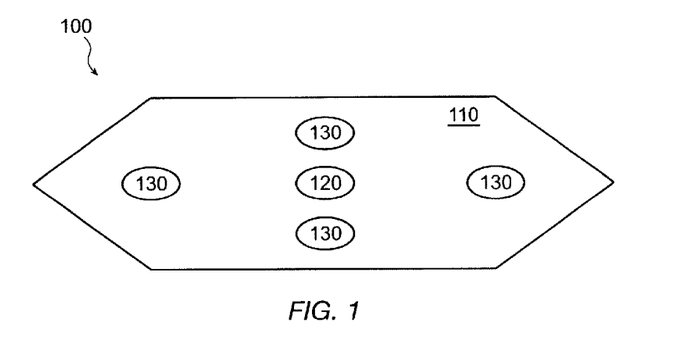
FIG. 1 shows a block diagram of a system using a new wireless transport layer in a wireless communication system.

FIG. 1 shows a block diagram of a system using a new wireless transport layer in a wireless communication system.

A system 100 includes a wireless communication cell 110, a base station controller 120, and one or more sets of customer premises equipment 130.

The wireless communication cell 110 includes a generally hexagon-shaped region of local surface area, such as might be found in a metropolitan region. Use of generally hexagon-shaped regions is known in the art of wireless communication because they are able to tile a local region with substantially no gaps. However, although in a preferred embodiment the wireless communication cell 110 includes a generally hexagon-shaped region, there is no particular requirement for using that particular shape; in alternative embodiments it may be useful to provide another shape or tiling of the local surface area.

The base station controller 120 includes a processor, program and data memory, mass storage, and one or more antennas for sending or receiving information using wireless communication techniques.

Similar to the base station controller 120, each set of customer premises equipment 130 includes a processor, program and data memory, mass storage, and one or more antennas for sending or receiving information using wireless communication techniques.

Communication among devices within the wireless communication cell 110 is conducted on one-to-one basis between each set of customer premises equipment 130 and the base station controller 120. Thus, the base station controller 120 communicates with each set of customer premises equipment 130, and each set of customer premises equipment 130 communicates with the base station controller 120. Customer premises equipment 130 do not communicate directly with other customer premises equipment 130.

Communication between the base station controller 120 and each set of customer premises equipment 130 is conducted using a time division duplex technique, in which time duration is are divided into individual frames, each one of which includes a "downstream" portion and an "upstream" portion. Unlike existing protocols in which transmissions are controlled by the transmitting side, the base station controller 120 controls tranmissions for both upstream and downstream directions, without specific requests from the customer premises equipment 130.

During the downstream portion of each frame, the base station controller 120 transmits, thus sending information to one or more sets of customer premises equipment 130. During the upstream portion of each frame, the base station controller automatically allocates slots for upstream re-transmission. This occurs in the absence of an explicit request for a slot from the customer premises equipment 130. Particular aspects of each frame are described with regard to FIG. 2. Time division duplex techniques are known in the art of wireless communication.

TDMA Frame

Figure 2:
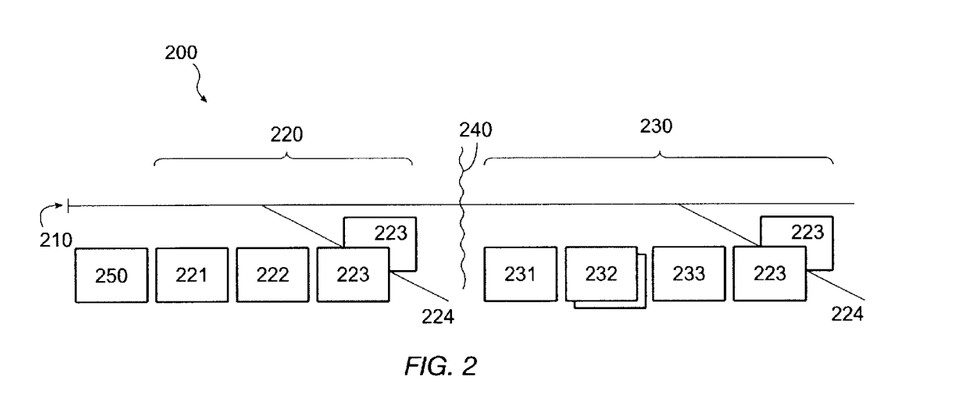
FIG. 2 shows a timing diagram of a TDMA frame using a new wireless transport layer in a wireless communication system.

FIG. 2 shows a timing diagram of a TDMA frame using a new wireless transport layer in a wireless communication system.

A timing diagram 200 shows a time division multiple access (TDMA) frame 210, including the downstream portion 220 and the upstream portion 230. A guard band 240 separates the downstream portion 220 from the upstream portion 230. In a preferred embodiment, the guard band 240 has a duration at least equal to twice the flight time of a transmission from the base station controller 120 to the most distant customer premises equipment 130 and back.

Each frame included in a TDMA frame 210 includes a frame descriptor packet 250 that describes the contents of the following frame to each consumer premises equipment 130. The frame descriptor packet 250 has several constant properties: (1) it is always the first packet in a TDMA frame 210; and (2) it is always a fixed size. In addition to these constants, the size of a TDMA frame 210 is also fixed and every TDMA frame always starts at times that are multiples of the frame size. These constant proper-ties ensure that contact between the consumer premises equipment 130 and the base sta-tion controller 120 is always maintained, even if one or more frame descriptor packets 250 should get "lost".

Each frame included in the downstream portion 220 includes a map section 221, a synchronization section 222, and one or more downstream payload elements 223, all of which are formatted as data packets, complete with packet headers and associated information. An inter-payload guard band 224 separates successive downstream payload elements 223. In a preferred embodiment, the inter-payload guard band 224 has a duration of sixteen symbols (where the duration of each symbol is responsive to the initial map section 221), but in alternative embodiments, the duration may take on other values.

Each frame in the upstream portion 230 includes one or more request sec-tions 231, one or more acknowledgment sections 232, a maintenance section 233, and one or more upstream payload elements 223, all of which are formatted as data packets, com-plete with packet headers and associated information. Similar to the downstream portion 220, an inter-payload guard band 224 separates successive upstream payload elements 223.

Unlike existing systems that monitor the number of packets that are transmitted, the system 100 monitors the number of bytes that are transmitted. Thus, the packet sizes included in the upstream and downstream frames can vary without breaking protocol.

The base station controller 120 directs each set of customer premises equipment 130 to conduct wireless communication using a set of physical parameters and a set of MAC parameters, as selected by the base station controller 120. Because each set of customer premises equipment 130 is uniquely situated, the base station controller 120 cannot generally determine a single set of physical parameters and MAC parameters to be used by all of the customer premises equipment 130 at once. Accordingly, the base station controller 120 determines the individual physical parameters and individual MAC parameters to be used by each individual set of customer premises equipment 130. After making each such individual determination, the base station controller 120 constructs a descriptor, for each set of customer premises equipment 130, of physical parameters and MAC parameters to be used by that set of customer premises equipment 130. In a preferred embodiment, this descriptor packet pre-announces the new set of parameters to each transmitter or receiver device, thereby allowing them to configure themselves to the new set of parameters. This is very different from existing schemes which embed the parameters in the header of a packet. Embedding the parameters in the header of a packet causes problems because the header always has to be sent using a common set of parameters. Moreover, using a packet header in this way does not allow sufficient time for the transmitter or receiver to re-configure itself for the data payload burst.

In a preferred embodiment, the physical parameters and MAC parameters that can be tailored by a base station controller 120 include some or all or a combination of the following:

Symbol rate
Modulation
Power
Polarization
Antennae
Forward Error Correction
Packet Size The map section 221 includes, for each set of customer premises equipment 130, the descriptor of physical parameters and MAC parameters to be used by that set of customer premises equipment 130.

The synchronization section 222 is used to synchronize the base station controller 120 clock (not shown) with clocks included in each customer premises equipment 130 (not shown). Each synchronization section 222 includes a set of information (such as an equalizer training sequence) known ahead of time by each set of customer premises equipment 130. Each set of customer premises equipment 130 is capable of receiving the synchronization section 222 (and therefore the known information in the synchronization section 222), and capable of synchronizing its internal clock (not shown) to correspond with a master clock (not shown) at the base station controller 120. For example, each set of customer premises equipment 130 can include a phase locked loop disposed so as to receive the synchronization section 222 and phase lock the internal clock for that set of customer premises equipment number 130 with the master clock at the base station controller 120. Thus, each set of customer premises equipment 130 is frequently synchronized with the base station controller 120. Techniques for synchronization of distributed equipment using wireless communication are known in the art of wireless communication.

Each downstream payload element 223 includes payload information sent from the base station controller 120 to a specific target set of customer premises equipment 130. The payload information is separately formatted by the base station controller 120 in response to the physical parameters and MAC parameters for the target customer premises equipment 130. Thus, each downstream payload element 223 includes a sequence of symbols, each encoding a sequence of bits, separately formatted by the base station controller 120, transmitted by the base station controller 120, and thus sent from the base station controller 120 to the target customer premises equipment 130.

Those skilled in the art will recognize, after perusal of this application, that each downstream payload element 223 is separately formatted according to an individual set of physical parameters and MAC parameters. Thus, each downstream payload element 223 might have an individual duration, and even when two downstream payload elements 223 have identical duration, might have an individual number of symbols, an individual number of bits per symbol, and an individual number of total bits for the downstream payload element 223.

Those skilled in the art will recognize, after perusal of this application, that each downstream payload element 223 is separately received and decoded by its target customer premises equipment 130, according to the individual set of physical parameters and MAC parameters determined by the base station controller 120 and sent by the base station controller 120 during the map section 221 in the same downstream portion 220 in the same TDMA frame 210. Thus, the base station controller 120 is able to send information to each set of customer premises equipment 130 and to direct each set of customer premises equipment 130 to receive that information using an optimal set of physical parameters and MAC parameters for that TDMA frame 210.

Similarly, the base station controller 120 directs each set of customer premises equipment 130 to conduct communications using the physical parameters and MAC parameters transmitted in the map section 221 of the same TDMA frame 210. Thus, upstream payload elements 223 sent by each individual set of customer premises equipment 130 are formatted by each individual set of customer premises equipment 130 using the optimal set of physical parameters and MAC parameters (as determined by the base station controller 120) for that TDMA frame 210.

The request section 231 includes a sequence of requests to transmit upstream payload elements 223, as requested by each set of customer premises equipment 130. The request section 231 is not expressed as a unit of time or a number of packets. The request section 231 specifically requests a number of payload bytes. This is preferable since given that the packets are of variable size, specifying their number does not tell the base station controller 120 about the number of bytes that need to be transmitted. Furthermore, it is not feasible for the consumer premises equipment 130 to make requests in units of transmit time because the link parameters assigned to the consumer premises equipment 130 change over time. The consumer premises equipment 130 sequentially numbers each byte and writes the sequence number of the last byte in its buffer into the request section 231. In combination with the sequence number of the byte being transmitted, this scheme allows the base station controller 120 to unambiguously estimate the current backlog in the consumer premises equipment 130.

The acknowledgment sections 232 each include an acknowledgment message by customer premises equipment 130 not otherwise sending an acknowledgment to the base station controller 120.

The maintenance section 233 includes maintenance information transmitted by either the base station controller 120 or by one or more sets of customer premises equipment 130.

Similar to the downstream payload elements 223, the upstream payload elements 223 each includes payload information sent from customer premises equipment 130 to the base station controller 120. The payload information is separately formatted by each customer premises equipment 130 in response to the physical parameters and MAC parameters determined by the base station controller 120 for the sending customer premises equipment 130 (and transmitted during the map section 221). Thus, similar to each downstream payload element 223, each upstream payload element 223 includes a sequence of symbols, each encoding a sequence of bits, separately formatted by the customer premises equipment 130, transmitted by the customer premises equipment 130, and thus sent from the customer premises equipment 130 to the base station controller 120.

Method of Operation

Figure 3A:
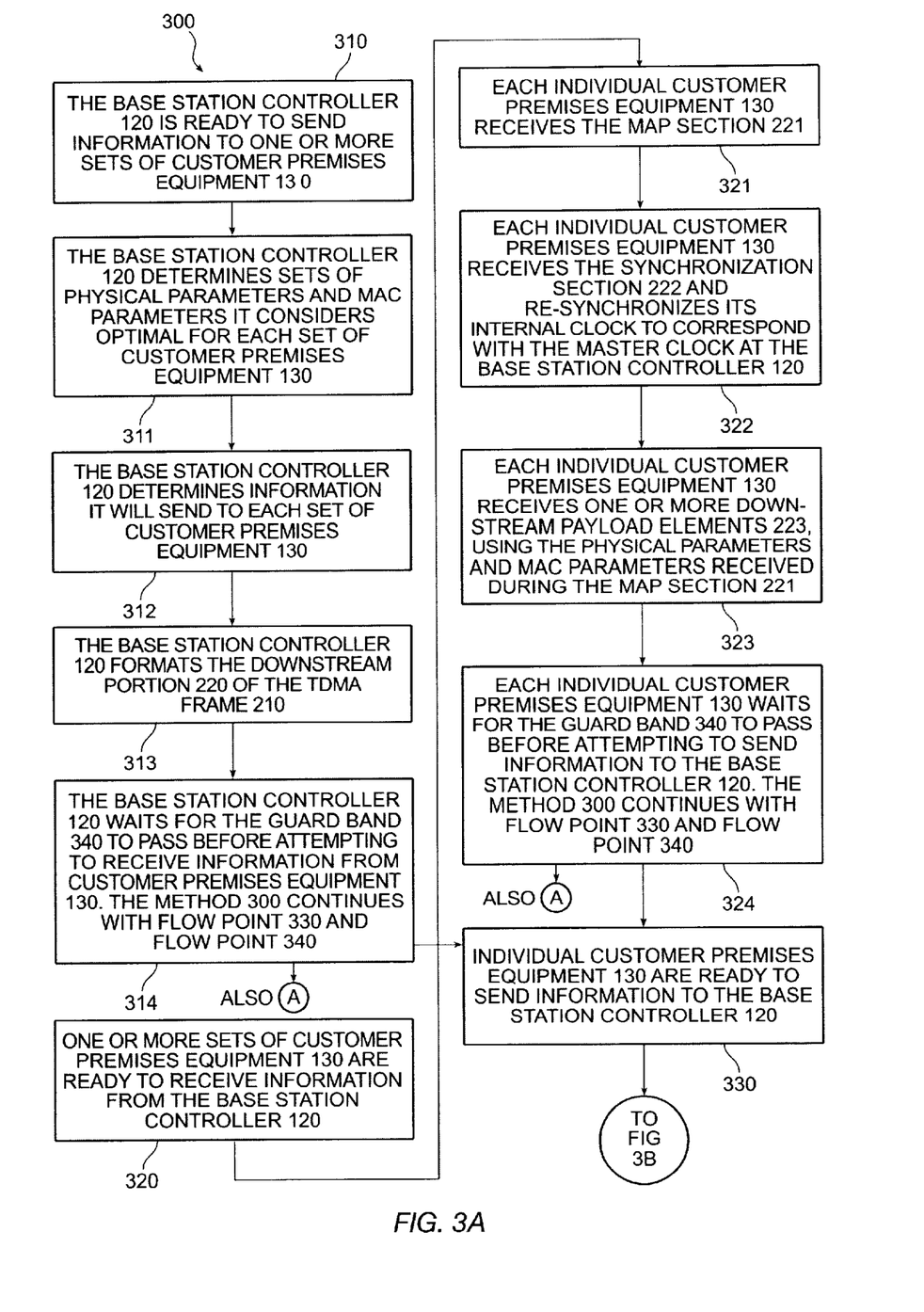
FIG. 3 shows a process flow diagram of a method for operating a system using a new wireless transport layer in a wireless communication system.
Figure 3B:
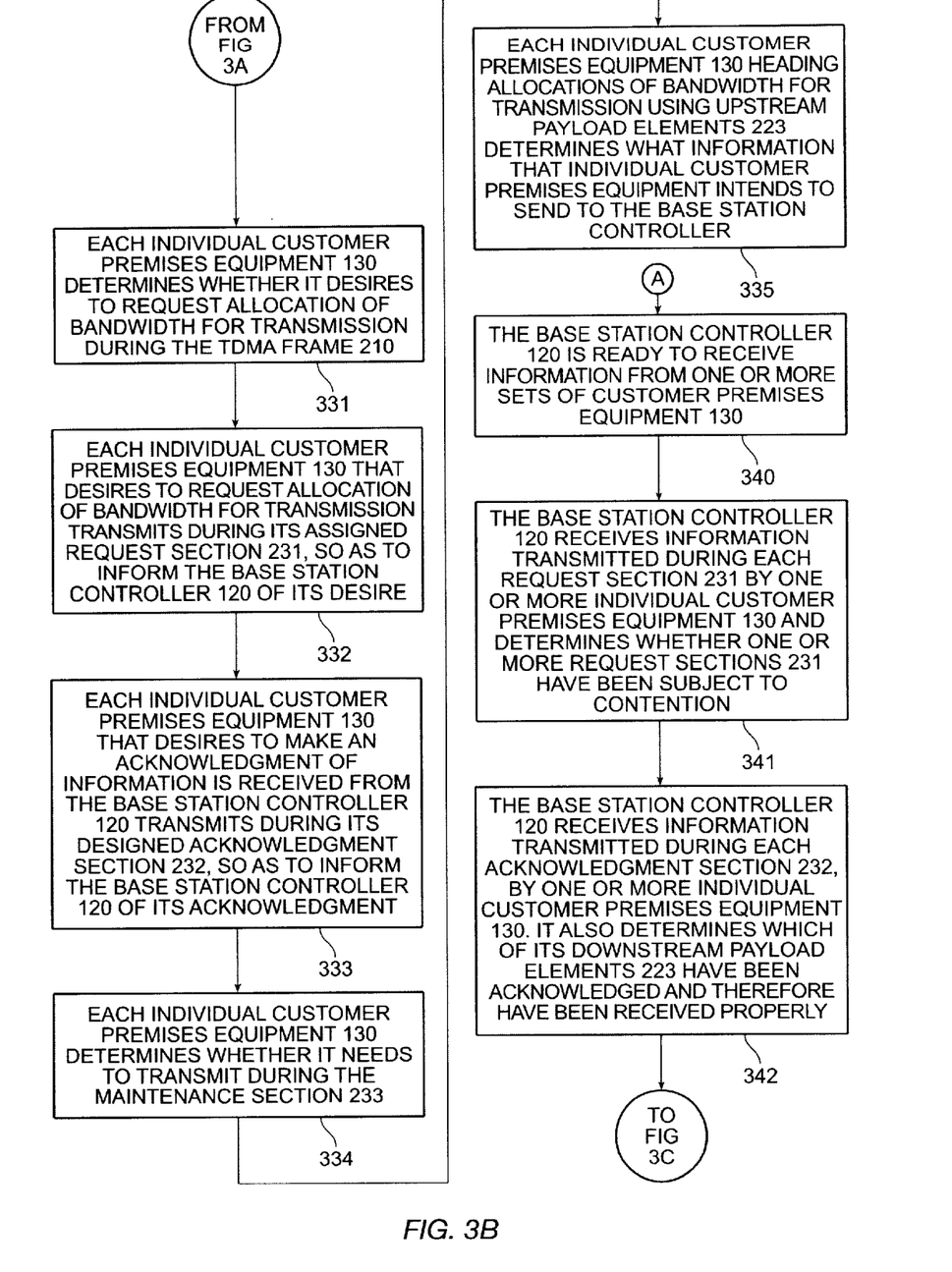
Figure 3C:
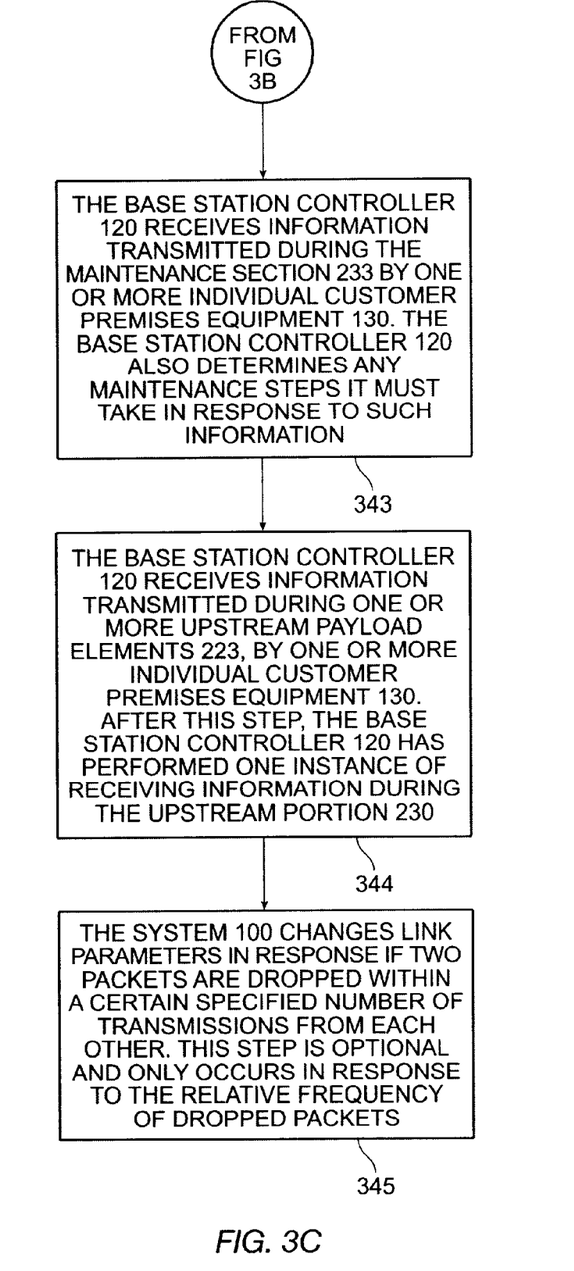

FIG. 3 shows a process flow diagram of a method for operating a system using a new wireless transport layer in a wireless communication system.

A method 300 includes a set of flow points and a set of steps. The system 100 performs the method 300. Although the method 300 is described serially, the steps of the method 300 can be performed by separate elements in conjunction or in parallel, whether asynchronously, in a pipelined manner, or otherwise. There is no particular requirement that the method 300 be performed in the same order in which this description lists the steps, except where so indicated.

Sending Downstream Information

At a flow point 310, the base station controller 120 is ready to send information to one or more sets of customer premises equipment 130.

At a step 311, the base station controller 120 determines sets of physical parameters and MAC parameters it considers optimal for each set of customer premises 13 equipment 130.

At a step 312, the base station controller 120 determines information it will send to each set of customer premises equipment 130.

At a step 313, the base station controller 120 formats the downstream portion 220 of the TDMA frame 210. As part of this step, the base station controller 120 formats the map section 221, to include the physical parameters and MAC parameters it determined in the step 311 for each individual set of customer premises equipment 130. As part of this step, the base station controller 120 formats the synchronization section 222. As part of this step, the base station controller 120 formats one or more downstream payload elements 223, to include the information it determined in the step 312 for each individual set of customer premises equipment 130.

At a step 314, the base station controller 120 waits for the guard band 240 to pass before attempting to receive information from customer premises equipment 130. The method 300 continues with the flow point 330 and the flow point 340.

After this step, the base station controller 120 has performed one instance of sending information during the downstream portion 220. The flow point 310 is reached repeatedly and the steps thereafter are performed repeatedly, for each TDMA frame 210.

Receiving Downstream Information

At a flow point 320, preferably reached in parallel with the flow point 310, one or more sets of customer premises equipment 130 are ready to receive information from the base station controller 120.

At a step 321, each individual customer premises equipment 130, having been earlier synchronized with the base station controller 120, receives the map section 221, including the physical parameters and MAC parameters the base station controller 120 considers optimal for communication with that individual of customer premises equipment 130.

At a step 322, each individual customer premises equipment 130 receives the synchronization section 222, and re-synchronizes its internal clock to correspond with the master clock at the base station controller 120. Since each individual customer premises equipment 130 can be a different distance from the base station controller 120, each individual customer premises equipment 130 will receive the synchronization section 222 at a (slightly) different time, and thus each individual customer premises equipment 130 will run its internal clock at a (slightly) different phase from the master clock at the base station controller 120.

At a step 323, each individual customer premises equipment 130 receives one or more downstream payload elements 223, using the physical parameters and MAC parameters it received during the map section 221.

At a step 324, each individual customer premises equipment 130 waits for the guard band 340 to pass before attempting to send information to the base station controller 120. The method 300 continues with the flow point 330 and the flow point 340.

After this step, each individual customer premises equipment 130 has performed one instance of receiving information during the downstream portion 220. The flow point 320 is reached repeatedly and the steps thereafter are performed repeatedly, for each TDMA frame 210.

Sending Upstream Information

At a flow point 330, individual customer premises equipment 130 are ready to send information to the base station controller 120.

At a step 331, each individual customer premises equipment 130 determines whether it desires to request allocation of bandwidth for transmission during the TDMA frame 210. As part of this step, the individual customer premises equipment 130 formats a request for transmission during a specific request section 231 designated for use by that individual customer premises equipment 130.

At a step 332, each individual customer premises equipment 130 that desires to request allocation of bandwidth for transmission transmits during its assigned request section 231, so as to inform the base station controller 120 of its desire. For example, individual customer premises equipment 130 might be given a numeric ordering by the base station controller 120, so that each individual customer premises equipment 130 has an assigned time slot during which it can request bandwidth allocation from the base station controller 120. Alternatively, individual customer premises equipment 130 might contend for individual request sections 231, using a "slotted aloha" technique or other known technique for contention for limited resources.

In a alternative embodiment, the base station controller 120 determines, for each request section 231, whether that request section 231 will be assigned to a particular customer premises equipment 130, or will be open for contention like multiple customer premises equipment 130. In the latter case, the base station controller 120 determines, for those request sections 231 which are open for contention, whether contention will be limited to particular subsets of customer premises equipment 130, or whether contention will be open to all customer premises equipment 130.

When the base station controller 120 receives requests for allocation of bandwidth, the base station controller 120 determines, for the following TDMA frame 210, the allocations of bandwidth it considers optimal for particular customer premises equipment 130. The particular allegations determined by the base station controller 120 are transmitted during the next TDMA frame 210, during the downstream portion 220, during the map section 221.

At a step 333, each individual customer premises equipment 130 that desires to make an acknowledgment of information is received from the base station controller 120, transmits during its designed acknowledgment section 232, so as to inform the 22 base station controller 120 of its acknowledgment. In a preferred embodiment, acknowledgment sections 232 are specifically assigned to individual customer premises equipment 130.

In an alternative embodiment, the base station controller 120 determines, for each acknowledgment section 232, which particular customer premises equipment 130 will have use of that acknowledgment section 232. Moreover, in a preferred embodiment, individual customer premises equipment 130 having allocations of bandwidth for transmission using upstream payload elements 223 will generally not require further bandwidth for transmission during acknowledgments sections 232. Accordingly, the base station controller 120 can reserve individual acknowledgment sections 232 for particular customer premises equipment 130 not already having allocations of bandwidth for transmission using upstream payload elements 223.

At a step 334, each individual customer premises equipment 130 determines whether it needs to transmit during the maintenance section 233. As part of this step, each individual customer premises equipment 130 which has so determined formats information for transmission during the maintenance action 233, and transmits that information during the maintenance section 233, so that the base station controller 120 can receive that information.

At a step 335, each individual customer premises equipment 130 heading allocations of bandwidth for transmission using upstream payload elements 223 determines what information that individual customer premises equipment intends to send to the base station controller 120. As part of this step, each individual customer premises equipment 130, intending to send information to the base station controller 120, formats information into an upstream payload element 223, and transmits that upstream payload element 223 during the time assigned for transmission to that individual cost of premises equipment 130.

In a preferred embodiment, the base station controller 120 determines, for each time slot possibly allocable for an upstream payload element 223, which specific individual customer premises equipment 130 is allocated that particular time slot. However, in alternative embodiments, the base station controller 120 might reserve one or more time slots allocable for upstream payload elements 223 for contention among more than one individual customer premises equipment 130.

As noted above, each individual customer premises equipment 130 uses the physical parameters and MAC parameters determined by the base station controller 120 for that particular customer premises equipment 130 and transmitted during the map section 221 of the same TDMA frame 210.

After this step, each individual customer premises equipment 130 has performed one instance of sending information during the upstream portion 230. The flow point 330 is reached repeatedly and the steps thereafter are performed repeatedly, for each TDMA frame 210.

Receiving Upstream Information

At a flow point 340, preferably reached in parallel with the flow point 330, the base station controller 120 is ready to receive information from one or more sets of customer premises equipment 130.

At a step 341, the base station controller 120 receives information transmitted during each request section 231 by one or more individual customer premises equipment 130. As part of this step, the base station controller 120 determines whether one or more request sections 231 have been subject to contention (and thus have been unable to be used to send or receive information). As part of this step, the base station con troller 120 determines what allocations of bandwidth for transmission it will make for individual customer premises equipment 130 for the following TDMA frame 210.

At a step 342, the base station controller 120 receives information transmitted during each acknowledgment section 232, by one or more individual customer premises equipment 130. As part of this step, the base station controller 120 determines which of its downstream payload elements 223 sent to individual customer premises equipment 130 have been acknowledged and therefore have been received properly.

At a step 343, the base station controller 120 receives information transmitted during the maintenance section 233, by one or more individual customer premises equipment 130. As part of this step, the base station controller 120 determines any maintenance steps it must take in response to such information.

At a step 344, the base station controller 120 receives information transmitted during one or more upstream payload elements 223, by one or more individual customer premises equipment 130. As part of this step, similar to receipt of individual request sections 231 (and possibly similar to receipt of individual acknowledgment sections 232), the base station controller 120 determines whether one or more upstream payload elements 223 have been subject to contention (and thus have been unable to be used to send or receive information).

In a alternative embodiment, the base station controller 120 parses those upstream payload elements 223 for which it has been able to receive information, and determines whether those upstream payload elements 223 include acknowledgments of downstream payload elements 223 which were sent by the base station controller 122 to individual customer premises equipment 130. If so, the base station controller 120 treats those acknowledgments which were "piggybacked" onto upstream payload elements 223 in similar manner to acknowledgments received during acknowledgment sections 232.

As noted above, the base station controller 120 receives and parses those upstream payload elements 223 using physical parameters and MAC parameters determined by the base station controller 120 for that particular customer premises equipment 130 and transmitted during the map section 221 of the same TDMA frame 210.

After this step, the base station controller 120 has performed one instance of receiving information during the upstream portion 230. The flow point 340 is reached repeatedly and the steps thereafter are performed repeatedly, for each TDMA frame 210.

An optional step 345 may occur at any time during the method 300 in response to the frequency of dropped packets. A packet is designated as "dropped" after the method 300 failed to get it across after re-transmitting it several times. In this step, the system 100 changes link parameters if two packets are dropped within a specified number of packet transmissions from each other. This allows the system 100 to tolerate a certain level of dropped packets without being affected. However, if the drop rate exceeds a certain threshold, the link parameters are changed. This approach is very different from existing methods which change link parameters in response to explicit measurements such as the signal-to-interference ratio.

Generality of the Invention

The invention has general applicability to various fields of use, not necessarily related to the services described above. For example, these fields of use can include one or more of, or some combination of, the following:

- The invention is applicable to other forms of wireless communication, such as frequency division multiple access (FDMA) or code division multiple access (CDMA, also known as spread spectrum communication);
- The invention is applicable to wireline (that is, non-wireless) communication, in which now can be achieved from dynamically adjusting communication parameters, such as physical parameters or MAC parameters. For example, the invention can be generalized to wireline communication using modems in which equalization parameters are to be dynamically adjusted.
- The invention is applicable to other wireless communication systems, such as satellite communication systems and (microwave tower or other) point to point transmission systems.

Other and further applications of the invention in its most general form, will be clear to those skilled in the art after perusal of this application, and are within the scope and spirit of the invention.

Technical Appendix

A technical appendix enclosed with this application is part of the disclosure of this application, and is hereby incorporated by reference as if fully set forth herein.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method, including steps of
   determining first values for a set of parameters for a communication link, in a first layer of an OSI model communication system;
   sending information using said first values;
   obtaining information regarding characteristics of said communication link; and
   adjusting said first values in response to said information, whereby further use of said communication link is responsive to said steps of adjusting;
   determining alternative values for said set of parameters for a second communication link in said communication system;
   sending information using said second communication link;
   obtaining alternative information regarding characteristics of said second communication link; and
   adjusting said alternative values in response to said alternative information, whereby further use of said second communication link is responsive to said steps of adjusting;
   wherein said steps of adjusting include
   determining second values in response to said information; and
   combining said first values and said second values;
   whereby said first values are adjusted in response to a result of said steps of combining.

2. A method as in claim 1, wherein said first values include at least two of: an antenna selection value, a power level value, a channel selection value, a modulation type value, a symbol rate value, an error code type value, a set of equalization values.

3. A method as in claim 1, wherein said steps of adjusting said alternative values are responsive to a result of said steps of adjusting said first values.

4. A method as in claim 1, wherein said steps of determining alternative values are responsive to a result of said steps of determining first values.

5. A method as in claim 1, including steps of
   determining second values for a set of parameters for communication link, in a second layer of said communication system;
   adjusting said second values and responses said information; and
   wherein said steps of sending information use said second values.

6. A method as in claim 5, wherein said first layer includes a media access layer; and
   said second layer includes at least one of: a physical layer, a network layer, a transport layer, an application layer.

7. A method as in claim 5, wherein
   said first layer includes a physical layer; and
   said second layer includes at least one of: a media access layer, a network layer, a transport layer, an application layer.

8. A method as in claim 1, wherein said second values include at least one of: a message size value, a set of acknowledgment and retransmission values, a TDD duty cycle value.

9. A method as in claim 1, wherein said steps of combining include adaptively altering said first values using at least one hysteresis parameter.

10. A method as in claim 1, wherein said steps of determining are responsive to a higher-level layer in said communication system.

11. A method as in claim 10, wherein
said first layer includes a media access layer; and
said second layer includes at least one of: a network layer, a transport layer, an application layer.

12. A method as in claim 10, wherein
said first layer includes a physical layer; and
said higher-level layer includes at least one of a media access layer, a network layer, a transport layer, an application layer.

13. A method, including steps of determining first values for a set of parameters for a communication link, in a first layer of an OSI model communication system;
sending information using said first values;
obtaining information regarding characteristics of said communication link; and
adjusting said first values in response to said information, whereby farther use of said communication link is responsive to said steps of adjusting;
wherein said steps of adjusting include
determining second values in response to said information; and
combining said first values and said second values;
wherein said steps of combining include adaptively altering said first values using at least one hysteresis parameter;
whereby said first values are adjusted in response to a result of said steps of combining.

14. A method as in claim 13, wherein said first values include at least two of: an antenna selection value, a power level value, a channel selection value, a modulation type value, a symbol rate value, an error code type value, a set of equalization values.

15. A method as in claim 13, including steps of
determining alternative values for said set of parameters for a second communication link in said communication system;
sending information using said second communication link;
obtaining alternative information regarding characteristics of said second communication link; and
adjusting said alternative values in response to said alternative information, whereby further use of said second communication link is responsive to said steps of adjusting.

16. A method as in claim 13, wherein said steps of adjusting said alternative values are responsive to a result of said steps of adjusting said first values.

17. A method as in claim 13, wherein said steps of determining alternative values are responsive to a result of said steps of determining first values.

18. A method as in claim 13, including steps of
determining second values for a set of parameters for communication link, in a second layer of said communication system;
adjusting said second values and responses said information; and
by wherein said steps of sending information use said second values.

19. A method as in claim 18, wherein
said first layer includes a media access layer; and
said second layer includes at least one of: a physical layer, a network layer, a transport layer, an application layer.

20. A method as in claim 18, wherein
said first layer includes a physical layer; and
said second layer includes at least one of: a media access layer, a network layer, a transport layer, an application layer.

21. A method as in claim 13, wherein said second values include at least one of: a message size value, a set of acknowledgment and retransmission values a TDD duty cycle value.

22. A method as in claim 13, wherein said steps of determining are responsive to a higher-level layer in said communication system.

23. A method as is in claim 22, wherein
said first layer includes a media access layer; and
said second layer includes at least one of: a network layer, a transport layer, an application layer.

24. A method as is in claim 22, wherein
said first layer includes a physical layer; and
said higher-level layer includes at least one of: a media access layer, a network layer, a transport layer, an application layer.

25. A base station controller, including
communication elements that send and receive information;
a processor that executes instructions to control the communication elements;
a memory that stores information including said instructions, said instructions comprising the steps of:
determining first values for a set of parameters for a communication link, in a first layer of an OSI model communication system;
sending information using said first values;
obtaining information regarding characteristics of said communication link; and
adjusting said first values in response to said information, whereby further use of said communication link is responsive to said steps of adjusting;
determining alternative values for said set of parameters for a second communication link in said communication system;
sending information using said second communication link;
obtaining alternative information regarding characteristics of said second communication link; and
adjusting said alternative values in response to said alternative information, whereby further use of said second communication link is responsive to said steps of adjusting;
wherein said steps of adjusting include
determining second values in response to said information; and
combining said first values and said second values;
whereby said first values are adjusted in response to a result of said steps of combining.

26. A base station controller as in claim 25, wherein said first values include at least two of: an antenna selection value, a power level value, a channel selection value, a modulation type value, a symbol rate value, an error code type value, a set of equalization values.

27. A base station controller as in claim 25, wherein said steps of adjusting said alternative values are responsive to a result of said steps of adjusting said first values.

28. A base station controller as in claim 25, wherein said steps of determining alternative values are responsive to a result of said steps of determining first values.

29. A base station controller as in claim 25, wherein said instructions further include steps of
- determining second values for a set of parameters for communication link, in a second layer of said communication system;
- adjusting said second values and responses said information; and
- wherein said steps of sending information use said second values.

30. A base station controller as in claim 25, wherein said second values include at least one of: a message size value, a set of acknowledgment and retransmission values, a TDD duty cycle value.

31. A base station controller as in claim 25, wherein said steps of combining include adaptively altering said first values using at least one hysteresis parameter.

32. A base station controller as in claim 25, wherein said steps of determining are responsive to a higher level layer in said communication system.

33. A base station controller, including
- communication elements that send and receive information;
- a processor that executes instructions to control the communication elements;
- a memory that stores information including said instructions, said instructions comprising the steps of:
  - determining first values for a set of parameters for a communication link, in a first layer of an OSI model communication system;
  - sending information using said first values;
  - obtaining information regarding characteristics of said communication link; and
  - adjusting said first values in response to said information, whereby further use of said communication link is responsive to said steps of adjusting;
  - wherein said steps of adjusting include
    - determining second values in response to said information; and
    - combining said first values and said second values;
    - wherein said steps of combining include adaptively altering said first values using at least one hysteresis parameter;
  - whereby said first values are adjusted in response to a result of said steps of combining.

34. A base station controller as in claim 33, wherein said first values include at least two of: an antenna selection value, a power level value, a channel selection value, a modulation type value, a symbol rate value, an error code type value, a set of equalization values.

35. A base station controller as in claim 33, wherein said instructions further include steps of
- determining alternative values for said set of parameters for a second communication link in said communication system;
- sending information using said second communication link;
- obtaining alternative information regarding characteristics of said second communication link; and
- adjusting said alternative values in response to said alternative information, whereby further use of said second communication link is responsive to said steps of adjusting.

36. A base station controller as in claim 33, wherein said steps of adjusting said alternative values are responsive to a result of said steps of adjusting said first values.

37. A base station controller as in claim 33, wherein said steps of determining alternative values are responsive to a result of said steps of determining first values.

38. A base station controller as in claim 33, wherein said instructions further include steps of
- determining second values for a set of parameters for communication link, in a second layer of said communication system;
- adjusting said second values and responses said information; and
- wherein said steps of sending information use said second values.

39. A base station controller as in claim 33, wherein said second values include at least one of: a message size value, a set of acknowledgment and retransmission values, a TDD duty cycle value.

40. A base station controller as in claim 33, wherein said steps of determining are responsive to a higher level layer in said communication system.

* * * * *